United States Patent [19]
Hahn et al.

[11] 3,794,756
[45] Feb. 26, 1974

[54] APPARATUS FOR COUPLING PHOTOGRAPHIC PARAMETERS INTO A MECHANISM FOR THE PRODUCTION OF PHOTOGRAPHIC COLOR SEPARATIONS

[75] Inventors: Alan S. Hahn, Bethel; Harold O. W. Jordan, Stamford, both of Conn.

[73] Assignee: Printing Developments, Inc., New York, N.Y.

[22] Filed: Sept. 14, 1971

[21] Appl. No.: 180,269

[52] U.S. Cl. ........... 178/5.4 CD, 178/6.7 R, 355/20
[51] Int. Cl. ...... G03b 27/76, H04n 1/38, H04n 1/46
[58] Field of Search ..... 178/5.2 A, DIG. 28, 7.5 SE, 178/DIG. 30, 6.8, DIG. 6, 7.7, 6.6 R, 6.7 A, 6.7 R, 69.5 F, 5.2 R, 6; 355/20

[56] References Cited

UNITED STATES PATENTS

| | | | |
|---|---|---|---|
| 3,459,888 | 8/1969 | Sokolov | 178/DIG. 6 |
| 3,557,303 | 1/1971 | Jordan | 178/5.2 A |
| 3,422,216 | 1/1969 | Kyte | 178/5.2 R |
| 3,617,623 | 11/1971 | Ross | 178/5.4 CD |
| 3,654,386 | 4/1972 | Baum | 178/DIG. 6 |

*Primary Examiner*—Howard W. Britton
*Attorney, Agent, or Firm*—Brumbaugh, Graves, Donohue & Raymond

[57] ABSTRACT

An electro-mechanical photographic color separation system having manually adjustable enlargement ratio controls and cropping controls, whereby color separations of an original can be formed having a different size and shape with respect to the original. Enlargement or reduction is accomplished by varying the scanning speed of the X-sweep and Y-sweep of a cathode ray beam scanner relative to an output film drum. Cropping is achieved by blanking the cathode ray beam scanner when the beam scanner attempts to scan outside a predetermined area defined by manually adjustable cropping controls.

7 Claims, 4 Drawing Figures

INVENTORS
ALAN S. HAHN &
HAROLD O. W. JORDAN
BY
Brumbaugh, Graves, Donohue & Raymond
their ATTORNEYS INVENTORS
ALAN S. HAHN &
HAROLD O. W. JORDAN
BY
*Brumbaugh, Graves, Donohue & Raymond*
their ATTORNEYS

PATENTED FEB 26 1974 3,794,756

SHEET 3 OF 3

INVENTORS
ALAN S. HAHN &
HAROLD O. W. JORDAN
BY
Brumbaugh, Graves, Donohue & Raymond
their ATTORNEYS

APPARATUS FOR COUPLING PHOTOGRAPHIC PARAMETERS INTO A MECHANISM FOR THE PRODUCTION OF PHOTOGRAPHIC COLOR SEPARATIONS

BACKGROUND OF THE INVENTION

This invention relates generally to systems for generating photographic color separations of an original, wherein a cathode ray tube provides a polychromatic light beam, synchronized with an output drum, for scanning the original image. The beam, modulated in intensity by the the original image, is converted into electrical signals that actuate means for recording photographic color separation images of the original on the output drum.

In particular, this invention relates to control apparatus for selectively varying the enlargement ratio between the original image and the output color separations. Also, control apparatus is provided for selectively cropping the color separations in accordance with cropping strips placed on an enlarged, projected image of the original.

U. S. Pat. Application, Ser. No. 692,787, now U. S. Pat. No. 3,557,303, issued Jan. 19, 1971 and assigned to the assignee of the present application, discloses a cathode ray tube scanning system for producing photographic color separations. In this system, an original image is held stationary in front of a cathode ray tube and is scanned by a polychromatic light beam generated by the cathode ray tube. The scanning beam is subjected to orthogonal X and Y deflection movements synchronized with and proportional to corresponding movements of a recording device which records a photographic image of the original on an output drum. The polychromatic light beam is directed to the original image and is modulated in color content and intensity by the hue and tone of the original image. A color analyzer accepts the modulated beam and separates the beam into yellow, magenta and cyan color components. Each component is converted into an electrical signal having an amplitude corresponding to the tone of the component. After processing, wherein, among other things, an achromatic color component of the image is derived, each electrical signal is supplied to a glow lamp of the corresponding color mounted on a carriage above the output drum. Each glow lamp causes the exposure of a film mounted on the output drum corresponding to one of the three color components, namely, yellow, magenta and cyan, as well as the achromatic color component, derived from these three. In this manner, color separation images of the originally scanned visual color image are formed.

The X deflection movement is controlled by monitoring the rotary movement of the output drum rotating at a constant speed. An electro-optical rotary shaft encoder is slaved to the output drum, and produces a train of electrical pulses which are then electronically integrated. Thus the output voltage appearing at the integrator output has a sawtooth wave form, one sawtooth for each revolution of the output drum. This sawtooth waveform is supplied to the X deflection coil of the cathode ray tube for control of the X deflection.

Control of the Y deflection movement of the electron beam generated by the cathode ray tube is accomplished by monitoring the lateral movement of the carriage. The carriage is driven so as to move a fixed increment in a direction axial to the output drum at the beginning of each revolution of the output drum. A wiper arm of a linear potentiometer is slaved to the carriage; the voltage appearing on the wiper arm has a staircase waveform and is used to drive the Y deflection coil of the cathode ray tube. Thus, the Y deflection is is proportional to the incremental movements of the carriage, and corresponds to the longitudinal position of the carriage with respect to the output drum.

Thus, the light beam produced by the cathode ray tube is synchronized with the movement of the glow lamps with respect to the output drum, and when the light beam scans the original image, a replica of the image is recorded on the output drum as a result of the glow lamps exposing the attached film.

The invention described herein is an improvement of the system disclosed in U. S. Pat. No. 3,557,303. To avoid undue repetition, the disclosure of U. S. Pat. No. 3,557,303 is incorporated herein by reference.

In making photographic color separations of an original, frequently it is necessary to alter the size and shape of the original copy to achieve a desired printed page layout. The parameters involved in such alteration are customarily the enlargement or reduction of the original copy to a desired size, and such cropping of the photograph as may be necessary to fit such an enlarged or reduced photograph into an allotted space. In current practice, the aforementioned enlargement and cropping parameters are generally obtained from a master layout sheet, and enlargements are made to approximate size either before or during the color separation process; subsequently, the color separation films are trimmed or masked to the desired cropped size.

In the case of mechanical enlargers fitted to color scanners, the enlargement ratio parameters, and their adjustments, are usually non-linear. As a result, the setup of the equipment is complicated by the need for specially plotted curves of mechanical adjustments versus output and input copy size ratios.

Likewise, a scanning system utilizing a cathode ray tube, or similar device, requires enlargement ratio and cropping limit information to define the rate and limits of its sweep raster, or the like. In order to handle different film sizes at input and output, it is necessary to have extensive charts and graphs of data. Furthermore, numerous adjustments to the cathode ray tube system are required. The ensuing processes are both awkward and time consuming.

With the present invention, it is possible to automatically couple the enlargement ratio and cropping parameters into a mechanism for the production of color separation negatives in such a manner that the negatives are produced in a form adequate for direct use without modification. Complicated adjustments are obviated, thus providing a system that is easy to use.

SUMMARY OF THE INVENTION

The improvement described herein comprises a manually adjustable enlargement control for controlling the cathode ray tube beam scanning system described in U.S. Pat. No. 3,557,303 by selectively controlling the ratio of proportionality between the sweep rate of the scanning beam and the sweep rate of the exposure beam provided by the glow lamps. Since the sweep rate of the exposure beam is constant, because the output drum rotates at a constant speed and the carriage moves across the output drum in fixed increments at a constant rate, the sweep rate of the scanning beam is varied. By increasing the sweep rate of the scanning beam with respect to that of the exposure beam, the output copy is reduced in size; by decreasing the ratio, the output copy is enlarged.

A further aspect of this invention comprises manually adjustable cropping controls for selectively controlling the size of the raster pattern generated by the cathode ray tube beam scanning system described in U.S. Pat. No. 3,557,303. In particular, a pair of horizontal and a pair of vertical cropping strips manually movable across the face of an enlarged projection of the original image are coupled to the beam blanking circuitry of the cathode ray tube to blank the scanning beam when the spot being scanned is outside a predetermined area defined by the four cropping strips.

When the desired enlargement ratio and cropping limits are manually programmed into the system through the controls, the output film copy on the drum is accurate in size and shape to the programmed layout.

DESCRIPTION OF THE PREFERRED EMBODIMENT

Figure 1:
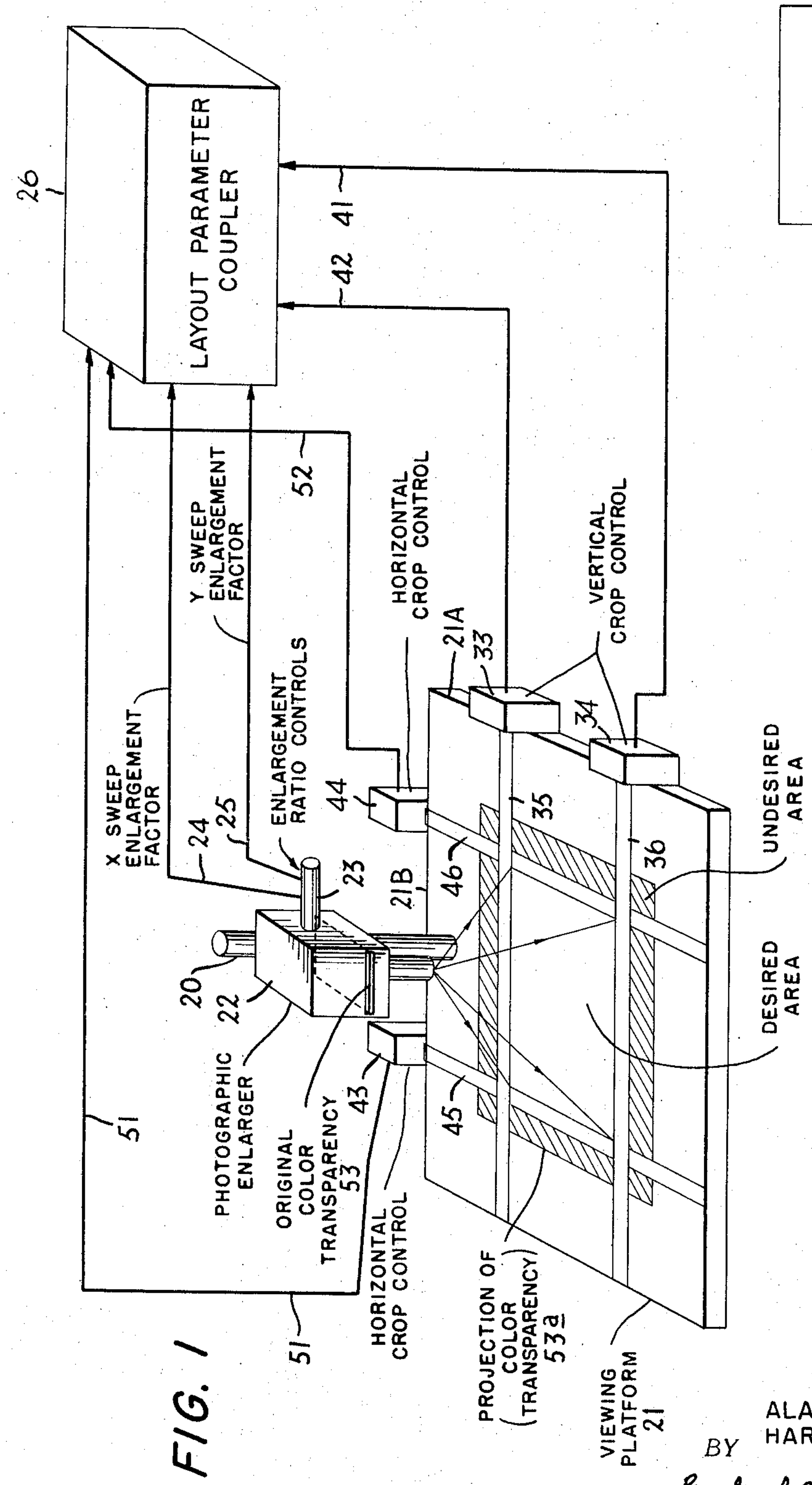
FIG. 1 is a perspective view of a preferred embodiment, illustrating the layout parameter coupler together with the arrangement of the enlargement ratio controls, the vertical crop controls and horizontal crop controls in relation to the enlarged projection of the original color transparency to be separated.
Figure 2:
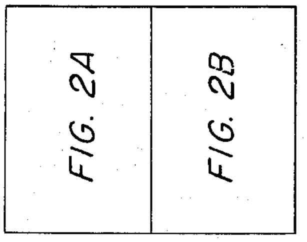
FIGS. 2A and 2B, assembled as FIG. 2, are a schematic block diagram of the preferred embodiment in its entirety except for the photographic enlarger and viewing platform.
Figure 2A:
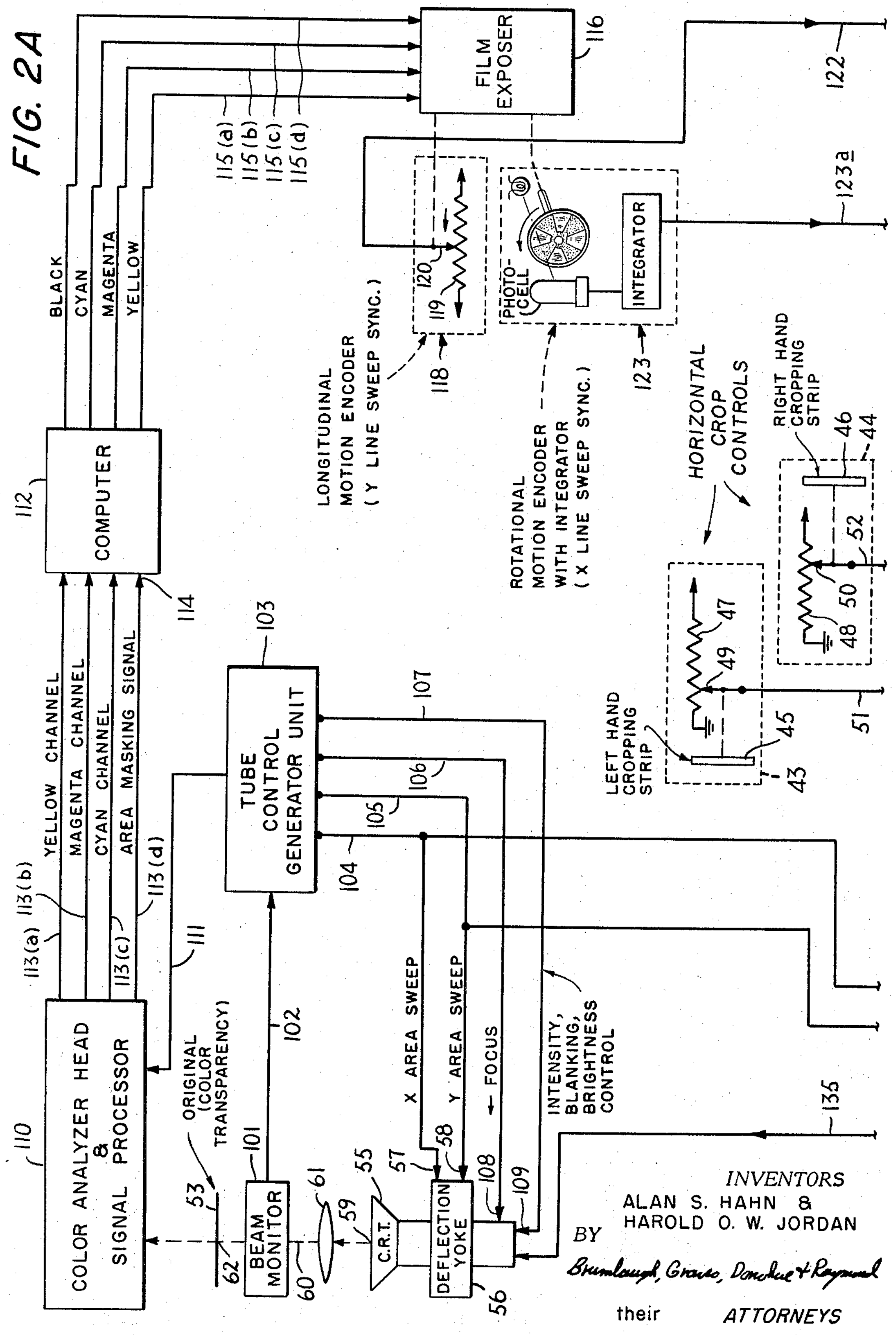
Figure 2B:
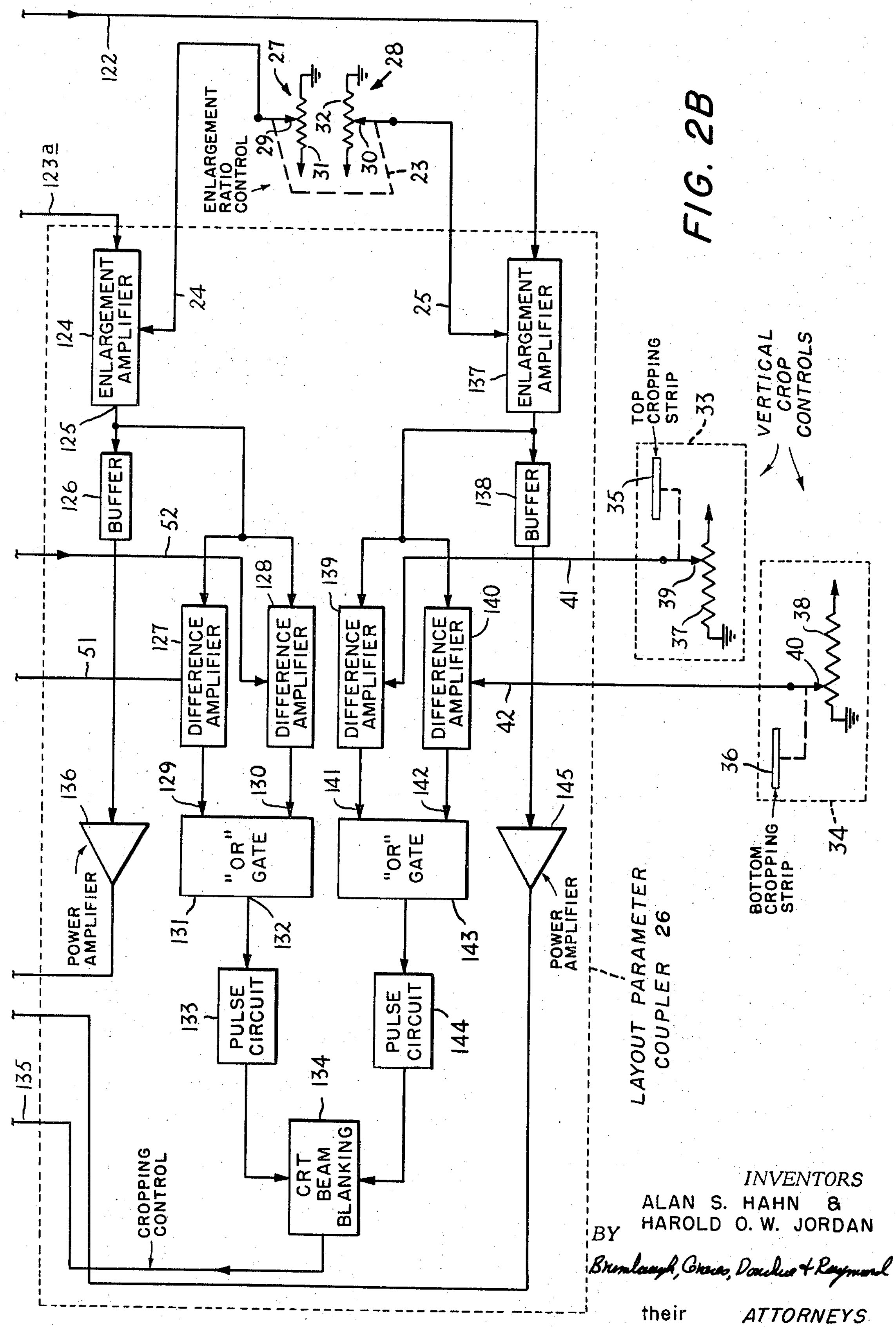

Referring now to FIG. 1, an upright stand 20 is mounted on a viewing platform 21. Movably attached to the stand 20 is a projection device 22 which is preferably a photographic enlarger having constant-focus capability. The photographic enlarger 22 projects an original color transparency 53 onto viewing platform 21 forming an image 53*a*. An enlargement ratio control unit 23 generates enlargement control signals which are transmitted by conductors 24 and 25 to a layout parameter coupler 26, The line 24 carries the X-sweep enlargement signal and the line 25 carries the Y-sweep enlargement signal. The enlargement ratio control 23 is programmed so that the ratio of output copy size to input original size is a linear function of the distance between the projection device 22 and the viewing platform 21. When this distance is increased, the enlargement ratio is increased by a corresponding amount. The linear relation between this ratio and the position of the projection device 22 is provided by two linear potentiometers 27 and 28, each connected between a suitable bias voltage and ground as seen in FIG. 2. As the projection device 22 moves vertically on stand 20, wipers 29 and 30 move correspondingly across linear resistors 31 and 32. The voltage signals on the wipers 29 and 30 are transmitted via lines 24 and 25 to the layout parameter coupler 26 where the signals are processed and directed to a cathode ray tube beam scanner, to be subsequently described, for control of the X deflection and Y deflection.

Vertical crop controls 33 and 34 are mounted independently for longitudinal movement along edge 21A of viewing platform 21. Copping strips 35 and 36 are affixed to the vertical crop controls 33 and 34 and extend in a direction orthogonal to the edge 21A on the top side of the viewing platform 21. These strips define the vertical boundaries of the area to be copied. In the preferred embodiment, the vertical crop controls 33 and 34 are potentiometers as seen in FIG. 2 and include resistors 37 and 38 connected to suitable biasing voltages and ground together with wiper arms 39 and 40, respectively. The cropping strips 35 and 36 are attached to the wipers 39 and 40 so that movement of the cropping strips cause a corresponding movement of the wiper arms 39 and 40 across the resistors 37 and 38. The voltages appearing on the wipers 39 and 40 are transmitted by the lines 41 and 42, respectively, to the layout parameter coupler 26, wherein these signals control the blanking circuitry of the cathode ray tube scanner as will be subsequently described.

Similarly, horizontal crop controls 43 and 44, preferably in the form of potentiometers (FIG. 2), are mounted on edge 21B. A pair of cropping strips 45 and 46, which define the horizontal boundaries of the area to be copied, are affixed to the crop controls 43 and 44, and selected voltages appearing across a pair of resistors 47 and 48 forming integral parts of the crop controls 43 and 44 are picked off the resistors by a pair of wipers 49 and 50 which move in accordance with the movement of the cropping stips 45 and 46. The voltages appearing at the wipers 49 and 50 are transmitted to the layout parameter coupler 26 by lines 51 and 52. As was the case with the vertical crop controls 33 and 34, the signals on lines 51 and 52 control the blanking circuitry of the cathode ray tube beam scanner in a manner which will be described.

As previously indicated, the photographic enlarger 22 projects the original color transparency 53 onto viewing platform 21 forming the image 53*a*. The enlarged image 53*a* corresponds in size to the output color separations. The cropping strips 35, 36 and 45, 46 define the desired boundaries of the enlarged color separations, and the vertical crop controls 33, 34 and the horizontal crop controls 43, 44 transmit cropping information to the layout parameter coupler 26 which in turn monitors the area scanned by the cathode ray tube beam scanner as will be described.

Referring now to FIG. 2, a cathode ray tube beam scanner 55 as described in U.S. Pat. No. 3,557,303 is connected to the photographic through the layout parameter coupler 26 and has a deflection yoke 56 with X and Y deflection terminals 57 and 58 for deflecting the electron beam formed within the cathode ray tube in X and Y directions which are orthogonal to each other. The electron beam generates in a conventional manner a spot 59 of intense polychromatic light at the point of impingement of the beam on the phosphor screen of the tube. The light from spot 59 passes in a beam 60 through an optical system 61 (represented schematically in FIG. 2 by a lens) which focuses the light into a white spot 62 scanning over the original color transparency 53 which has been removed from the photographic enlarger 22 and positioned relative to the cathode ray tube beam scanner 55, the optical system 61 and color analyzer head and signal processer 110 as shown in FIG. 2. The scanning is made in a raster pattern similar in shape and proportional in size to that generated on the screen of tube 55 by the flying spot 59. The optical system 61 is designed to focus the beam 60 on the color transparency 53.

A beam monitoring device 101, located between the tube 55 and the transparency 53, intercepts a small fraction of the light from spot 59 and generates a corresponding electrical signal which is transmitted to a tube control generator unit 103 by means of lead 102. The beam monitoring device 101 and the tube control generator unit 103 are fully described in U.S. Pat. No. 3,557,303, and need not be described in detail herein. Generally, however, these two devices assist with area scanning around the normal spot position 62 for improved contrast of the output copy. For this purpose, the tube control generator unit 103 supplements the primary voltages applied to the X and Y deflection terminals 57 and 58 of the deflection yoke 56. These auxiliary voltages are transmitted via leads 104 and 105 respectively. Lead 106, which connects the tube control generator unit 103 to terminal 108 of the cathode ray tube 55, transmits a focus control signal for use in area scanning. Lead 107, which connects the tube control generator unit 103 to terminal 109 of the cathode ray tube 55, transmits a signal controlling the intensity, blanking, and brightness of the beam spot during area scanning.

The beam 60 in passing through the original color transparency 53 is modulated in color content and intensity by the hue and tone of the original transparency. The modulated beam is collected by a color analyzer head 110 and is separated into its three primary color components, namely, yellow, magenta and cyan. The color analyzer head 110 together with the color separation circuitry is described in detail in U. S. Pat. No. 3,557,303. The analyzer head 110 also accepts a gating signal from the tube control generator unit 103 via line 111 and generates an area masking signal which is transmitted to terminal 114 of a photographic color scanner computer 112. The area masking signal is used in the area scanning process for enhanced contrast as described in the patent application noted above. The three color components derived by the color analyzer 110 are converted into electrical signals and transmitted to the photographic color scanner computer 112 through channels 113*a*, 113*b* and 113*c*.

The computer 112 has a function, among others, of deriving a "black" color component signal, the instantaneous amplitude of which is representative of the achromatic content of the beam 60 as modulated by the color transparency 53. The yellow, magenta and cyan signals (the chromatic components) together with the black signal (the achromatic component) comprise the output of the computer unit 112 and are supplied to the leads 115*a* – 115*d*, respectively.

The signals on leads 115*a* – 115*d* are applied to a film exposure unit 116 for generating an output copy as described in U.S. Pat. No. 3,557,303. In particular, the signals on leads 115*a* – 115*d* are supplied to a recorder comprising glow lamps corresponding to the three primary colors, namely, yellow, magenta and cyan, and also a black glow lamp for the achromatic component of the color signal. The exposure unit 116 also includes an output drum upon which is mounted four films to be exposed by the respective glow lamps, whereby color separation images of the originally scanned visual color image 53 can be formed, and a carriage unit which is mounted above the output drum. There are affixed to this carriage the four glow lamps corresponding to the yellow, magenta, cyan and black components of the color signal. The output drum is driven at a constant rotational speed and the carriage is driven so as to move a fixed increment in a direction parallel to the longitudinal axis of the output drum at the beginning of each revolution of the output drum. The movement of the carriage is monitored by a longitudinal motion encoder 118.

The longitudinal motion encoder 118 comprises a linear potentiometer having a resistor 119, connected between suitable bias voltage sources, and a wiper arm 120. The incremental longitudinal motion of the carriage is coupled to the wiper 120 causing the voltage appearing on an output conductor 122 to have a staircase waveform.

The rotational movement of the output drum is monitored by a conventional rotational motion encoder 123 comprising a segmented glass disc illuminated by a lamp. The light transmitted through these segments is received by a photoelectroc cell which produces a series of electrical pulses corresponding to the pulses of light received by the photoelectric cell. These electrical pulses are then electronically integrated, causing a sawtooth shaped voltage waveform to appear at an output line 123*a* as the segmented disc rotates with the output drum.

Considering first the X deflection circuitry, the signal on line 123*a* is supplied to an enlargement amplifier 124 of the layout parameter coupler 26. The amplification factor of the enlargement amplifier 124 is determined by the voltage appearing on lead 24 connected to the enlargement ratio control 23. The signal at output terminal 125 of the enlargement amplifier 124 is supplied to the input terminal of a buffer 126 and to the input terminals of a pair of parallel connected difference amplifiers 127 and 128. Another input terminal of the difference amplifier 127 is coupled to the wiper arm 49 of the horizontal crop control potentiometer 43 via a conductor 51. This difference amplifier produces an output signal when the voltage appearing on line 51 of the horizontal crop control 43, is greater than the voltage produced by the enlargement amplifier 124. Another input terminal of the difference amplifier 128 is coupled to wiper arm 50 of the horizontal crop control 44 via a conductor 52. This difference amplifier provides an output signal when the voltage appearing at the output terminal 125 of the enlargement amplifier 124 is greater than the voltage appearing on the wiper 50 of the horizontal crop control 44. The output signals of the difference amplifiers 127 and 128 are supplied to a pair of input terminals 129 and 130, respectively, of an "OR" gate 131. The "OR" gate supplies an output signal to terminal 132 only when either or both of the difference amplifiers 127, 128 provide output signals. The output terminal 132 is connected to a pulse circuit 133 which responds to the appropriate voltage appearing at terminal 132 to supply a pulse to a cathode ray tube beam blanking circuit 134. The output of the cathode ray tube beam blanking circuit 134 is applied via lead 135 to the cathode ray tube 55 and blanks the electron beam formed by the cathode ray tube 55 whenever a voltage appears on this lead.

The buffer 126 provides a time delay for the signal appearing at the output terminal 125 of the amplifier 124 to prevent this signal from reaching the cathode ray tube 55 before this signal can be compared with the position voltages formed by the horizontal crop controls 43, 44 and a blanking signal directed to cathode ray tube 55, if that is necessary. The output of the buffer 126 is directed to a power amplifier 136 which in turn provides an input to the X deflection terminal 57 of the yoke 56.

In summary, the position of the cropping strip 45, which determines the left hand boundary of the desired area to be copied (FIG. 1), is converted by horizontal crop control 43 into a voltage signal appearing on line 51. The position of cropping strip 46 is converted by horizontal crop control 44 into a voltage appearing on line 52. The circumferential position of the glow lamps with respect to the output drum is converted into a voltage signal on line 123*a* by means of the rotational motion encoder 123. Since the circumferential movement of the glow lamps with respect to the output drum is caused by the rotational movement of the output drum, the resulting waveform produced by the rotational motion encoder and its associated integrator has a sawtooth shape. This sawtooth waveform is amplified by the enlargement amplifier 124 by a factor determined by the enlargement ratio control 23. The voltage appearing at the output terminal 125 of the enlargement amplifier 124 determines the extent of the X-sweep of the electron beam. This X deflection voltage is compared with the two voltage signals corresponding to the horizontal limits as determined by the horizontal crop controls 43 and 44. If the level of the horizontal sweep waveform corresponding to the circumferential position of the glow lamps with respect to the output film is below the voltage signal appearing at the output of the horizontal crop control 43 (this corresponds to the scanning beam scanning a spot to the left of cropping strip 45), a beam blanking signal will be sent to the cathode ray tube 55. Likewise, if the level of the horizontal sweep sawtooth waveform corresponding to the circumferential position of the glow lamps with respect to the output film is greater than the voltage appearing on line 52 (this corresponds to the scanning beam scanning a spot to the right of cropping strip 46), a signal will be generated for blanking the electron beam of the cathode ray tube 55.

It can be seen from the foregoing, that enlargement and reduction in the X direction is a result of the adjustable variation between the X deflection movement of the cathode ray tube beam and the circumferential movement of the glow lamps with respect to the output drum. The glow lamps move circumferentially with respect to the output drum at a constant speed, because the output drum is rotated as a constant rotational velocity. After the completion of one revolution, the glow lamps are incremented a fixed distance in the longitudinal direction. The X-sweep movement of the scanning beam is synchronized with the circumferential movement of the glow lamps with respect to the output drum. The circumferential sweep rate of the glow lamp across the output film is fixed, but the X-sweep rate of the scanning beam is responsive to the signal generated by the enlargement ratio control 23.

Enlargement in the horizontal direction is accomplished by decreasing the slope of the sawtooth waveform generated by the rotational encoder 123. The slope of this waveform is varied by amplifier 124 in response to the voltage appearing on wiper 29 of the enlargement ratio control 23; an increase in the voltage level on wiper 29 decreases the amplification factor of amplifier 124. A decrease in the slope of the sawtooth waveform supplied to the X deflection terminal 57 of cathode ray tube 55 causes a slower X-sweep rate. It will be appreciated that reducing the X-sweep rate of the scanning beam with respect to the constant X-sweep rate of the exposure beam (provided by the output drum rotating at a constant speed) enables the production of an output copy enlarged in size. Similarly, it is possible to reduce the size of the output copy by increasing the slope of the sawtooth waveform supplied to the X deflection terminal 57 through selectively adjusting the voltage signal supplied by wiper 29 of potentiometer 27.

In a similar manner the vertical enlargement ratio and the vertical cropping limits are coupled to the cathode ray tube 55. The staircase waveform appearing at the wiper 120 of the longitudinal motion encoder 118 is supplied to the enlargement amplifier 137. The amplification factor of this amplifier is determined by the voltage appearing on wiper 30 of the enlargement ratio control 23 which is transmitted to amplifier 137 by a lead 25. The output of the enlargement amplifier 137 is applied to a buffer 138 and to a pair of parallel connected difference amplifiers 139 and 140. The difference amplifier 139 provides an output signal when the voltage appearing on the output terminal of the enlargement amplifier 137 is greater than the voltage appearing on control 33 (this corresponds to the scanning beam scanning a spot above cropping strip 35). The difference amplifier 140 gives an output signal when the voltage appearing at the output of the enlargement amplifier 137 is less than the voltage appearing on lead 42 coupled to the vertical crop control 34 (this corresponds to the scanning beam scanning a spot below cropping strip 36).

The buffer 138 provides the same function as buffer 126 and delays the signals appearing at the output of the enlargement amplifier 137 until this voltage output can be compared with the position voltages formed by the vertical crop controls 33 and 34 and until the blanking signal, if required, is transmitted to the cathode ray tube 55. The output of the buffer 138 is fed to a power amplifier 145 and the amplified signal is transmitted to the Y deflection terminal 58 of the deflection yoke 56 on the cathode ray tube 55.

Enlargement in the Y direction is a result of the adjustable variation between the Y deflection movement of the cathode ray tube beam and the horizontal movement of the glow lamps with respect to the output drum. The glow lamps are driven longitudinally with respect to the output drum in fixed increments. Each incremental movement of the glow lamps is initiated by the completion of each revolution of the output drum. The incremental movement in the Y direction of the scanning beam is synchronized with the incremental movement of the glow lamps; thus, both the scanning beam and the glow lamps are incremented upon the completion of each revolution of the output drum. The amount of the Y deflection of the exposure beam provided by the glow lamps is fixed, but the amount of the Y deflection of the scanning beam is responsive to the signal generated by the enlargement ratio control 23.

For an enlarged output copy in the vertical direction, the potentiometer 28 is adjusted to supply a greater amplitude voltage signal to the enlargement amplifier 137 than in the situation where the enlargement factor is one-to-one. The increased voltage level on line 25 causes the amplifier 137 to supply a reduced vertical deflection voltage to cathode ray tube 55. The reduction in amplitude of the vertical deflection voltage causes a corresponding reduction in the distance which the scanning beam is deflected as is well understood. The output of the amplifier 137 is a staircase waveform with each "step" corresponding to an increment of longitudinal movement of the carriage. Since the staircase waveform is reduced in size compared to the situation where there is no enlargement, the scanning beam is incremented vertically across the original image in smaller increments than in the one-to-one situation. It will be appreciated that the result is that the output copy is an enlargement of the original. For a reduced output copy, the staircase waveform is increased in magnitude by amplifier 137 in response to a voltage signal, produced by potentiometer 28, which is of lesser amplitude than the voltage signal supplied in the one-to-one situation.

It will be appreciated that the enlargement ratio and cropping controls described above provide apparatus for coupling these parameters into a system for producing photographic color separations. The controls can be manually adjusted to provide an output copy having a desired size and shape.

It will be understood that the invention is susceptible of considerable modification and not limited to the above described illustrative embodiment. For example, means other than potentiometers may be incorporated to provide predetermined voltages corresponding to the enlargement and cropping parameters. Accordingly, all such modifications and variations within the skill of the art are included within the intent of the inventions as defined by the following claims.

We claim:

1. In a photographic color separation system having a projection device for forming a projected image of an original transparency, a cathode ray tube with horizontal and vertical deflection means for beam scanning the original transparency in response to horizontal and vertical deflection signals generated by predetermined horizontal and vertical movement of an output recorder across the face of and in a plane parallel to one or more output color separations of said original transparency, the improvement comprising an adjustable enlargement ratio control means for linearly varying the magnitude of said horizontal and vertical deflection signals to provide an enlargement ratio of the output separations to the original transparency, a horizontal cropping means movable vertically across the face of the projected image of the original transparency and a vertical cropping means movable horizontally across the face of the projected image of the original transparency for defining the area of the original transparency to be scanned by the cathode ray tube, adjustable horizontal and vertical crop controls responsive to the positions of the horizontal and vertical cropping means respectively on the face of the projected image for programming into the system predetermined horizontal and vertical cropping limits, and blanking means for disabling the scanning beam when the area being scanned is outside a predetermined area defined by the horizontal and vertical cropping limits.

2. The system as in claim 1 wherein the projecting device is a photographic enlarger and the system further includes a drive means for moving the cathode ray tube in a direction perpendicular to the plane of the projected image to a predetermined position, the enlargement ratio control varies the enlargement ratio in accordance with the vertical distance between the cathode ray tube and the projected image.

3. The system as in claim 2 wherein the vertical deflection means is responsive to a predetermined voltage appearing on a wiper of a linear potentiometer, the wiper means of the linear potentiometer movable in response to the longitudinal movements of the recorder across the face of the output separations, the horizontal deflection means is responsive to a predetermined voltage provided by a rotary shaft encoder, responsive to the rotational movements of the recorder across the face of the output separations, the enlargement ratio control means includes a linear potentiometer having a wiper means for providing a predetermined voltage, the wiper means of the enlargement ratio control means movable in response to the movements of the cathode ray tube in a direction perpendicular to the plane of the projected image, further including a first and second amplifier means for amplifying respectively the horizontal and vertical deflection signals before said signals reach the corresponding deflection means of the cathode ray tube, and a means for varying the amplification factor of the first and second amplifier means in accordance with the voltage signal appearing on the wiper means of the enlargement ratio control means.

4. The system as in claim 3 wherein horizontal and vertical crop controls each comprising a first potentiometer having a wiper means for providing a voltage signal corresponding to a predetermined minimum and a second potentiometer having a wiper means for providing a voltage signal corresponding to a predetermined maximum, the vertical cropping means comprises a left-hand and a right-hand cropping means and the horizontal cropping means comprises a top and bottom cropping means, the wipers of the first and second potentiometers of the horizontal crop controls movable in response to the left-hand and right-hand cropping means, the wipers of the first and second potentiometers of the vertical crop controls movable in response to the top and bottom cropping means, the blanking means includes means for selectively activating the blanking means when the amplified horizontal deflection signal is less than the predetermined minimum signal or greater than the predetermined maximum signal as provided by the horizontal crop controls or when the amplified vertical deflection signal is less than the predetermined minimum signal or greater than the predetermined maximum signal as provided by the vertical crop controls.

5. In a photographic copying system including a projection device for forming a projected image of an original transparency, a cathode ray tube means for generating a polychromatic scanning beam, blanking means for selectively blanking the beam, horizontal and vertical deflection means for directing the scanning beam to a spot on the original transparency which modulates the scanning beam, an output film, a recorder means for accepting the modulated beam and recording the modulated beam on the output film, means for producing relative horizontal and vertical movement between the recorder and the output film in a plane parallel to that of the output film, slave means for slaving the horizontal and vertical deflection means to the corresponding relative movements of the recorder and output film, the improvement comprising drive means for moving the cathode ray tube in a direction perpendicular to the plane of the projected image to a predetermined position and an enlargement ratio control means for varying the ratio of the horizontal and vertical deflections to the corresponding relative movements of the recorder and output film in accordance with the distance between the cathode ray tube and the projected image.

6. The system as in claim 5 further including a horizontal cropping means movable vertically across the face of the projected image and a vertical cropping means movable horizontally across the face of the projected image for defining the area of the projected image to be scanned by the cathode ray tube, adjustable horizontal and vertical cropping control means, responsive to the positions of the horizontal and vertical cropping means respectively on the face of the projected image for programming into the system predetermined horizontal and vertical cropping limits, and actuating means for actuating the blanking means to preclude spot scanning outside a predetermined area defined by the horizontal and vertical cropping limits.

7. In a photographic copying system including a projection device for forming a projected image of an original transparency, a cathode ray tube for generating a polychromatic scanning beam, blanking means for selectively blanking the beam, horizontal and vertical deflection means for directing the scanning beam to a spot on the original transparency which modulates the scanning beam, an output film, a recorder means for accepting the modulated beam and recording the modulated beam on the output film, means for producing relative horizontal and vertical movement between the recorder and the output film in a plane parallel to that of the output film, the improvement comprising a horizontal cropping means movable vertically across the face of the projected image and a vertical cropping means movable horizontally across the face of the projected image for defining the area of the original transparency to be scanned by the cathode ray tube, adjustable horizontal and vertical cropping control means responsive to the positions of the horizontal and vertical cropping means respectively on the face of the projected image for programming into the system predetermined horizontal and vertical cropping limits, and actuating means for actuating the blanking means to preclude spot scanning outside a predetermined area defined by the horizontal and vertical cropping limits.

* * * * *

PO-1050
(5/69)

UNITED STATES PATENT OFFICE
CERTIFICATE OF CORRECTION

Patent No. 3,794,756 Dated February 26, 1974

Inventor(s) Alan S. Hahn and Harold O. W. Jordan

It is certified that error appears in the above-identified patent and that said Letters Patent are hereby corrected as shown below:

Column 1, line 12, after "by" delete --the--;

Column 2, line 5, after "deflection" delete --is--;

Column 4, line 29, "stips" should be --strips--;

line 49, after "photographic" insert --enlarger 22--;

Signed and sealed this 10th day of September 1974.

(SEAL)
Attest:

McCOY M. GIBSON, JR.
Attesting Officer

C. MARSHALL DANN
Commissioner of Patents